United States Patent [19]

Neill

[11] 3,886,661

[45] June 3, 1975

[54] DENTAL PROSTHETIC DEVICE TEACHING AID

[75] Inventor: Max A. Neill, Hampton, Va.

[73] Assignee: The Neill Technique, Inc., Hampton, Va.

[22] Filed: Aug. 21, 1972

[21] Appl. No.: 282,120

Related U.S. Application Data

[63] Continuation of Ser. No. 67,553, Aug. 27, 1970, abandoned.

[52] U.S. Cl. ................................. 32/71
[51] Int. Cl. ............................... A61c 19/00
[58] Field of Search ....................... 35/26; 32/71

[56] References Cited
UNITED STATES PATENTS 2,333,795   5/1921   Kellerman et al. .................. 32/71
3,315,374   4/1967   Geraty ................................. 35/26

Primary Examiner—Robert Peshock
Attorney, Agent, or Firm—Morton, Bernard, Brown, Roberts & Sutherland

[57] ABSTRACT

A kit of components from which models of assorted dental prosthetic devices can be assembled by the hobbyist or the student. Completely or partially edentulous maxillary and mandibular models can be assembled, together with teeth to form either models of complete denture sets or models of partial denture sets such as crowns, bridges, and inlays. Different model kits can be provided having as components, for example, baseplates, flanges, teeth, clasps, connectors, and an articulator permitting assembly of a variety of models of dental prosthetic devices.

10 Claims, 10 Drawing Figures

PATENTED JUN 3 1975  SHEET 1  3,886,661
FIG. 1.
FIG. 2.
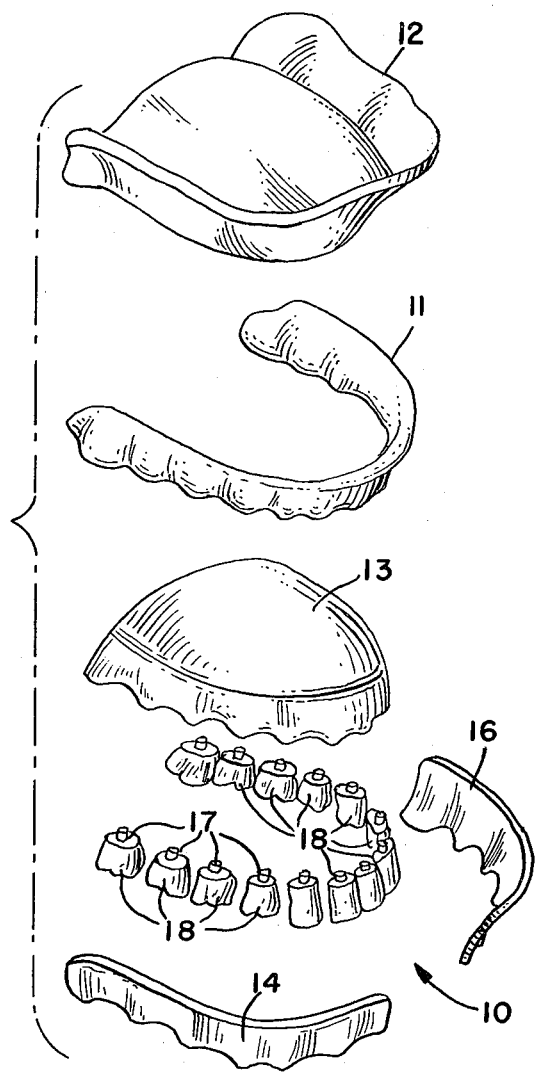
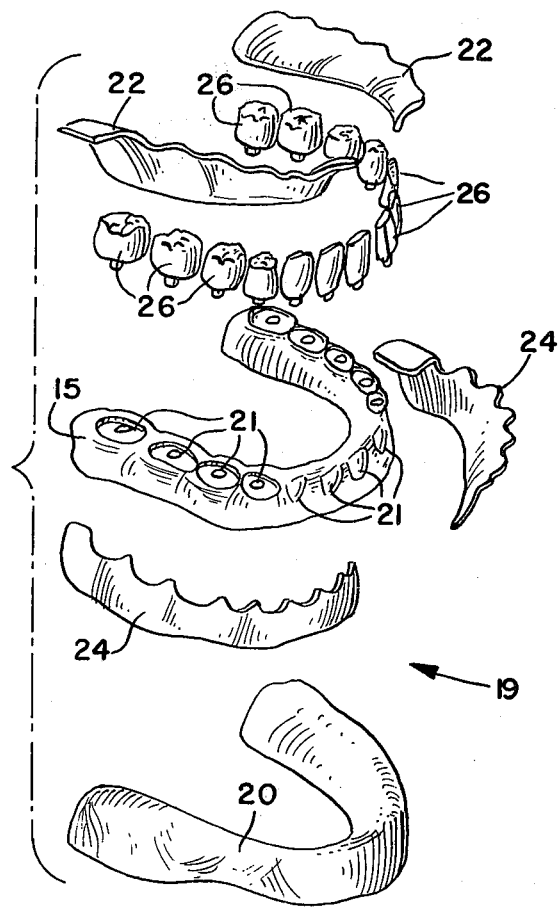
FIG. 3.
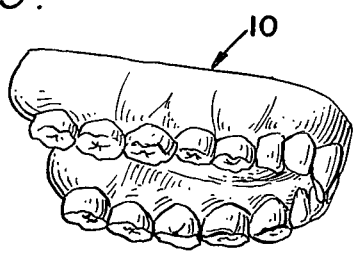
FIG. 4.
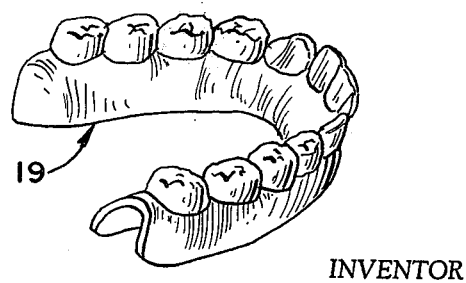
INVENTOR
MAX A. NEILL
BY McLean, Morton & Boustead
ATTORNEYS

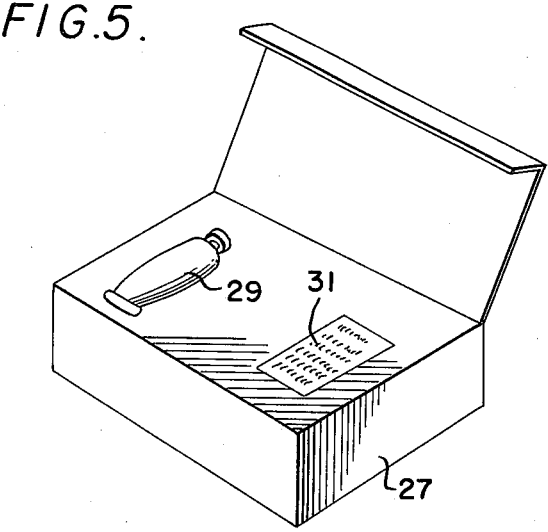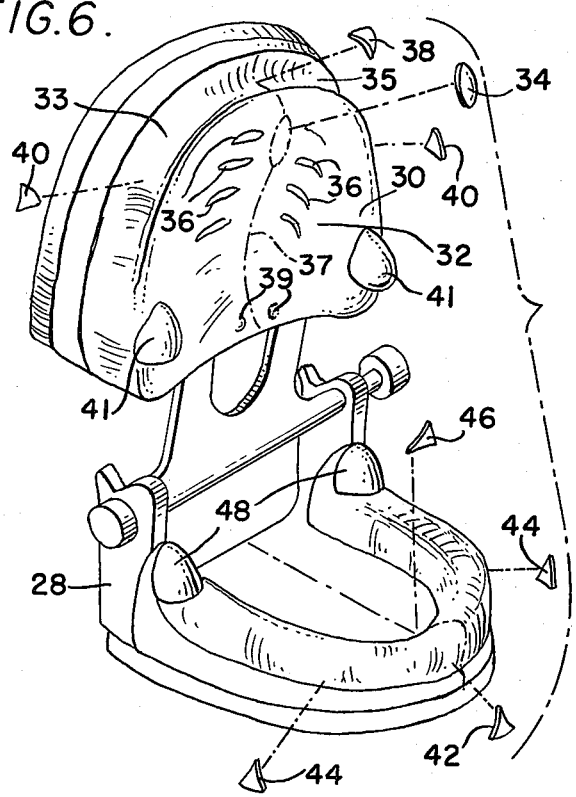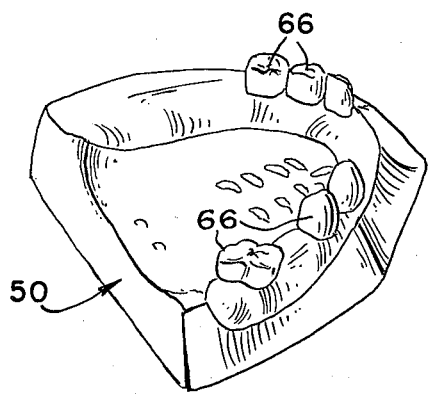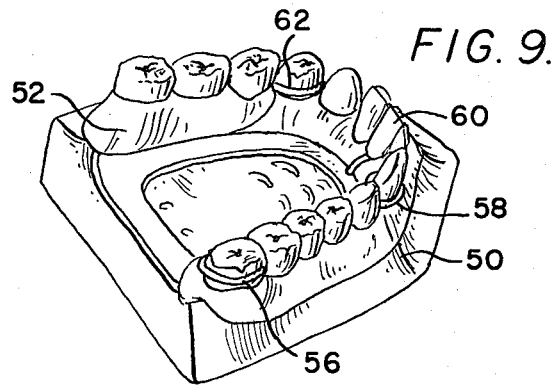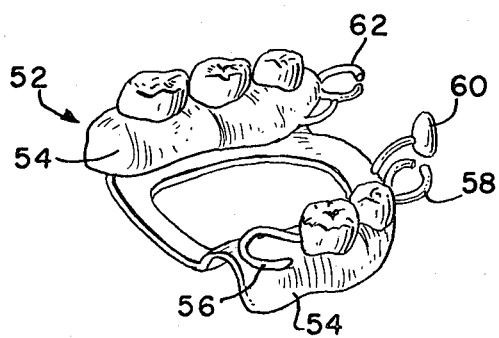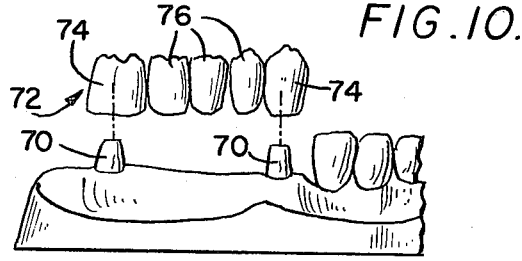

DENTAL PROSTHETIC DEVICE TEACHING AID

This application is a continuation of Ser. No. 67,553 filed Aug. 27, 1970 and now abandoned.

The present invention pertains to dental prosthetics. More particularly, the present invention pertains to the making of dental anatomical models and of models of dental prosthetic devices for displays, as a hobby, and as teaching aids.

Generally, practicing dentists when confronted with a patient in need of a dental prosthesis will determine the characteristics required of such device to suit the needs of the particular patient and then will have the prosthetic device made by a dental technician, for example, in a laboratory specializing in the making of such devices. These dental technicians, while not doctors of dental surgery, are highly trained and skilled persons who provide for the dentists services which oftentimes the dentists can not perform themselves. The dental technicians have had considerable amount of schooling in their work which enables them to provide these essential services.

Often the general public, including dental patients, are unaware of the role of the dental technician in making dental prosthetic devices or false teeth. Many dental patients assume that the dentist with whom they have contact makes the false teeth himself, when in fact the dentist determines the characteristics required by the dental prosthetic device and transmits these requirements to a dental technician to make the device for him. As a consequence, many young people, at a point in life when they are either knowingly or subconsciously selecting the career field in which they will work during the major portion of their lives, do not have an awareness of the dental technician field. Therefore, young people who otherwise might become interested in the dental technician field as an area of work frequently do not develop such interest because they are unaware of the field at the time their career choice is being made.

Those people entering the dental technician area require extensive schooling. Much schooling in the making of dental prosthetic devices is essential before the dental technician is competent to undertake such work for practicing dentists. This schooling includes a considerable amount of training in making of dental anatomical models and of models of dental prosthetic devices prior to the first attempts by the student at making of actual prosthetic devices. Thus, in the following specification and claims, by the expression "dental model" is meant by dental anatomical models and models of dental prosthetic devices.

The present invention is an apparatus by means of which dental anatomical models and models of dental prosthetic devices can be assembled. The apparatus includes material from which completely or partially edentulous maxillary and mandibular models of the mouth can be made and from which can be assembled models of dental prosthetic devices such as complete sets of dentures or either fixed or removable partial dentures. By means of the present invention, young people of an age at which there is generally an interest in the building of models of various sorts can make dental models. Such model making often generates a continuing interest in dental prosthetics, with the result that the young people select dental technician work as a lifetime career. The present invention is also suitable for use as a teaching aid in schools in which dental technician training is given. These schools might be either resident schools in which the students are present at the school facilities, or correspondent schools in which the students receive instruction and material by mail and do the studying and model making at home at their own pace. The present invention can further be used to assemble a display device by practicing dentists to aid in the explanation to patients of dental work required by the patients.

These and other aspects and advantages of the present invention are more apparent in the following detailed description and claims, particularly when considered in conjunction with the accompanying drawings in which like parts bear like reference numerals. In the drawings:

FIG. 1 and FIG. 2 depict components which form two models of dental prosthetic devices in accordance with the present invention;

FIG. 3 and FIG. 4 depict the dental prosthetic devices of FIGS. 1 and 2 respectively in assembled form;

FIG. 5 depicts a container suitable for use in the display and sale of the present invention;

FIG. 6 depicts an edentulous dental anatomical model in accordance with the present invention and including an articulator;

FIG. 7 and FIG. 8 depict additional dental models in accordance with the present invention and are shown in assembled relationship in FIG. 9; and FIG. 10 is a partial view depicting further dental models in accordance with the present invention.

FIG. 1 depicts components of a model 10 of a maxillary dental prosthetic device or upper denture plate. Model 10 includes upper base plate 12, biterim 11, palate 13, flanges 14 and 16 and teeth 18. Likewise, FIG. 2 depicts components of a model 19 of a mandibular dental prosthetic device and includes lower base plate 20, biterim 15, flanges 22 and 24 and teeth 26. Teeth 18 and 26 are provided with keys 17 which mate with sockets 21 in biterims 11 and 15. The components of FIG. 1 when assembled form the model 10 of a maxillary dental prosthetic device, as depicted in FIG. 3, and likewise the components of FIG. 2 when assembled form the model 19 of the mandibular dental prosthetic device depicted in FIG. 4. The components of FIGS. 1 and 2 can be provided for the hobbyist or the student in a kit, for example in container 27 of FIG. 5, which can also contain the necessary adhesive 29 and sufficient instructions 31 to enable assembly of models 10 and 19.

FIG. 6 depicts the components of edentulous maxillary and mandibular dental anatomical models on an articulator 28. The maxillary model includes simulated mouth portions 33 and 35 which are joined by the student or hobbyist along median suture 37 to provide familiarity with anatomical features. The dental model 30 includes the simulated palate 32 to which can be attached models of several anatomical features. Thus, for example, the simulated incisive papilla 34, rugae 36, and tuberosities 41 can be attached to palate 32 in which indentations 39 are provided to simulate the fovea palatine. Likewise, the labial frenum 38 and the two buccal frenum 40 are provided for attachment to maxillary model 30. Similarly, in the mandibular model, the simulated labial frenum 42, the buccal frenum 44 and the lingual frenum 46 are provided for attachment, together with simulated retromolar pads 48. The assembly of these maxillary and mandibular models acquaints the student or hobbyist with these several anatomical landmarks.

Models can also be provided of partial dentures. Thus, for example, FIG. 7 depicts a partially edentulous maxillary model 50 which can be assembled from components in accordance with the present invention, while FIG. 8 depicts a mating denture model 52 including saddle areas 54, pontic 60, and clasps 56, 58, and 62. The abutment teeth 66 which support saddle areas 54 on model 50 may be of any recognized American Dental Association rest preparation cut. Likewise, the saddle areas 54, pontic 60, and clasps 56, 58, and 62 may be of any standard design. The partially edentulous model 50 may be provided with any number of missing teeth and the corresponding number of abutment teeth, and while FIG. 7 depicts a maxillary model, a corresponding mandibular model could, of course, be provided. Model 50 is depicted in FIG. 9 with denture 52 in place. Models of crowns, bridges, and inlays can also be provided with or without precision attachments to fit abutment teeth either singularly or plurally.

FIG. 10 depicts prepared abutment teeth 70 on which fits bridge 72 including crowns 74 and pontics 76. The models of FIGS. 7, 8 and 10 likewise are provided disassembled in kits for the student or hobbyist, together with the necessary adhesive and sufficient instructions for assembly.

The flanges provided with the model kits, such as flanges 14, 16, 22 and 24, in FIGS. 1 and 2, can be either anatomical or festooned. The male keys 17 provided in teeth 18 and 26 can be of any standard design to secure the teeth to the biterims 11 and 15. Likewise, the other components can include keys to enable their assembly. If desired, these keys can be coded numerically or alphabetically to aid in assembly, and can have elements protruding from one or more sides to make a more unique fit. The keys 17 can be slightly larger than their corresponding sockets 21 to provide a firm but removable union.

By utilizing kits in accordance with the present invention to assemble dental anatomical models and models of dental prosthetic devices, the student or hobbyist can acquire considerable acquaintance not only with assembly techniques of importance to dental technicians, but also with anatomical landmarks. In addition, the hobbyist will have his interest stimulated by this work. In view of the wide variety of kits which can be provided in accordance with the present invention, the hobbyist can put together numerous different models, thus increasing his interest in the field of dental technology. The components of the models can be made of any suitable material, such as, for example, polyethylene, styrene, or dental acrylic resins of any desired color, with plastic, chrome cobalt, steel or bronze keys. It can thus be seen that although the present invention has been described with reference to preferred embodiments, numerous rearrangements and modifications can be made, and still the result will be within the scope of the invention.

What is claimed is:

1. A teaching aid for instruction of terminology of dental prosthetic devices comprising:

a plurality of components including a dental prosthetic base plate; a biterim adapted to mate with said base plate; a plurality of teeth, each including key means adapted for receipt by said biterim; and a plurality of flanges adapted to mate with said base plate, said biterim, and said teeth;

an adhesive adapted for adhering said components together to form a model of a dental prosthetic device; and a set of instructions for teaching the form and terminology of a dental prosthetic device.

2. A teaching aid as claimed in claim 1 further comprising a maxillary dental anatomical model; a mandibular dental anatomical model; and an articulator supporting said maxillary dental anatomical model and said mandibular dental anatomical model in articulating juxtaposition; said maxillary and mandibular dental anatomical models being at least partially edentulous and adapted to support a dental prosthetic device.

3. A teaching aid as claimed in claim 2 in which said components further include simulated labial frenum and simulated buccal frenum adapted to mate with said maxillary dental anatomical model.

4. A teaching aid as claimed in claim 2 in which said components further include simulated rugae and simulated tuberosities adapted to mate with said maxillary dental anatomical model.

5. A teaching aid as claimed in claim 2 in which at least one of said maxillary and mandibular dental anatomical models includes a plurality of teeth have a preparation cut and in which said components further include a model of a fixed partial dental prosthetic device.

6. A teaching aid as claimed in claim 5 in which said fixed partial dental prosthetic device is a crown.

7. A teaching aid as claimed in claim 5 in which said fixed partial dental prosthetic device is a bridge.

8. A teaching aid as claimed in claim 2 in which said components include a palate adapted to mate with said base plate, said biterim and said teeth, and in which said base plate, said biterim, said teeth and said flanges are maxillary components adapted to form a maxillary dental model.

9. A teaching aid as claimed in claim 1 in which said base plate, said biterim and said flanges are mandibular components adapted to form a mandibular dental model.

10. A teaching aid as claimed in claim 1 in which said base plate, said biterim, said teeth, and said flanges are adapted to form a model of a removable partial dental prosthetic device.

* * * * *